Jan. 29, 1957   F. R. EICHNER   2,779,862
PACKAGE RACK WITH VEHICLE ILLUMINATING MEANS
Filed Oct. 13, 1953   2 Sheets-Sheet 1

INVENTOR
Ferdinand R. Eichner
BY
L. D. Beech
ATTORNEY

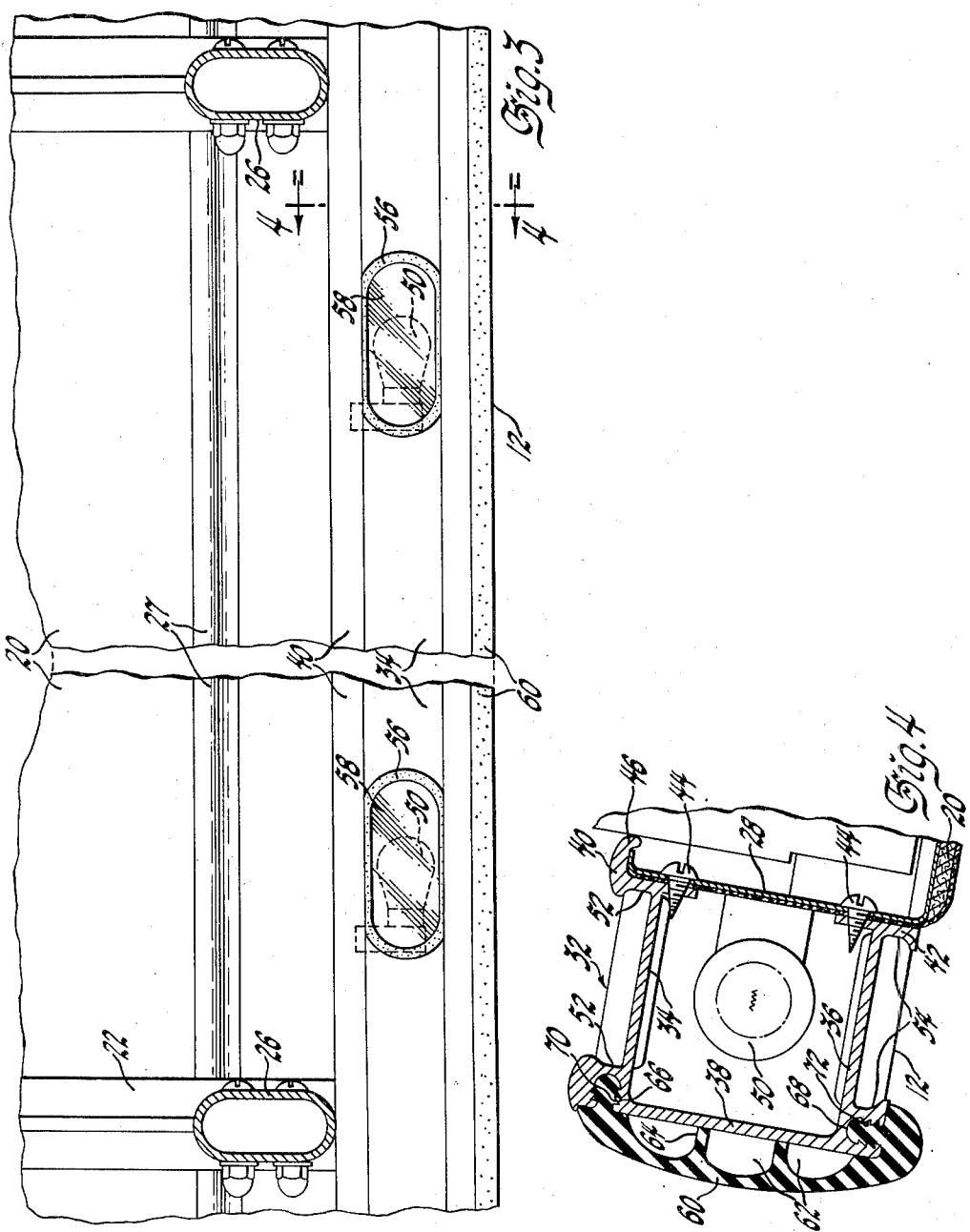

United States Patent Office 2,779,862
Patented Jan. 29, 1957

2,779,862

PACKAGE RACK WITH VEHICLE ILLUMINATING MEANS

Ferdinand R. Eichner, Pontiac, Mich., assignor to General Motors Corporation, Detroit, Mich., a corporation of Delaware Application October 13, 1953, Serial No. 385,770

2 Claims. (Cl. 240—7.1)

This invention relates to means for illuminating passenger carrying vehicles such as intercity busses, railway coaches, airplanes and the like and in particular to illuminating means adaptable for association with a luggage or package rack employed within such vehicles.

Package carrying racks or trays employed within passenger carrying vehicles for holding small parcels and luggage cases belonging to the passenger are generally provided with some source of illumination as a matter of convenience to the passenger. The location of the illuminating means presents somewhat of a problem in that lighting fixtures secured near the rear of the rack are obstructed by the packages, those secured above the carriage trays reduce the available storage space, and those associated with the rack itself are subjected to possible damage upon being engaged by the heavier parcels placed upon the trays.

Of further concern in illuminating these vehicles is the necessity for providing adequate lighting of the aisle or passageway between the rows of seats disposed along each side of the vehicle. This is a matter of safety as well as convenience.

It is now proposed to provide a housing for lighting fixtures which may be associated with the leading edge of a package carrying rack to provide proper tray illumination and which is disposed substantially over the passenger aisle for adequate lighting of such passageway. The housing or light rail is adapted to extend the full length of the rack and is sufficiently durable in construction to protect the fixtures secured therein against possible damage from placing packages upon the trays. A bumper rail or guard is associated with the outwardly extended side of the light rail to further protect the light fixtures by cushioning any force received thereagainst. Padding is also secured beneath the carriage trays for still further protection.

The light diffusing lenses secured within the light rail are resiliently mounted and are easily removed to facilitate access to broken or burned-out elements of the lighting fixtures. These lenses are located in openings formed within the light rail at any preselected position along its length. Openings may be provided through the light rail on both sides of the lighting fixture to enable use of a single fixture for both tray and aisle illumination. Openings need however be formed only in one side or the other as suits the particular lighting requirements. Great flexibility of design is thus provided in that the light sources may be spaced to suit the requirements of any chosen situation.

It is further proposed to provide a lighting fixture housing which is adaptable for use in a number of different types of conveyances and in varied models of each vehicle without extensive alteration. It is proposed to provide as a standard accessory an elongated housing which may be cut to any desired length and which is adapted to receive any number of lighting fixtures at any selected position therein.

In the drawings:

Figure 2 is taken substantially in the plane of line 2—2 of Figure 1.

Figure 3 is a top view of a part of a package carrying rack and light rail as taken in the plane of line 3—3 of Figure 2 looking in the direction of the arrows thereon.

Figure 4 is a cross-sectional view of the light rail shown in Figure 2 as taken in the plane of line 4—4 of Figure 3 looking in the direction of the arrows thereon.

Figure 1:
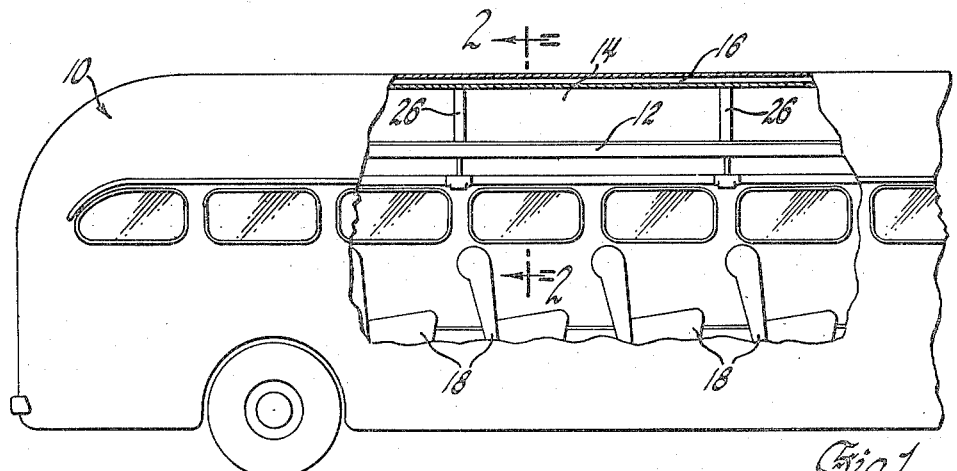
Figure 1 shows a part of a passenger carrying vehicle having a side wall broken away to more clearly show the use of the present invention within such a vehicle.
Figure 2:
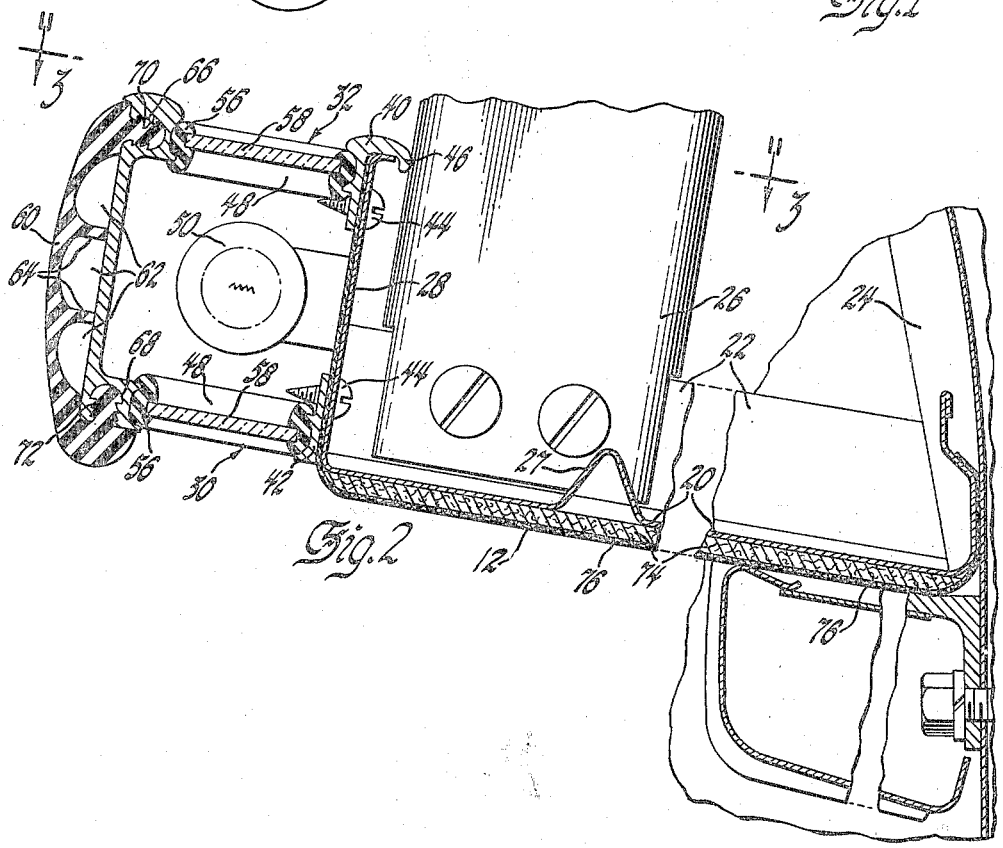
Figure 2 is a fragmentary cross-sectional side view of a package carrying rack having a light rail embodying the principals of this invention secured thereto.

In the bus 10 is shown a package carrying rack 12 secured to the side wall 14 of the vehicle and extended horizontally outward in spaced relation to the vehicle roof 16. The package rack 12 is disposed above the passenger seats 18 and extends the entire length of the vehicle. Such a carriage rack provides a convenient yet removed space for the storage of small parcels and luggage belonging to the passengers.

Although the package carrying rack 12 may be made in any convenient manner in the present instance it comprises a plurality of trays 20 secured to the underside of supports 22 extending outwardly from the sides of the vehicle. The supports 22 are secured at one end to the ribs or braces 24 which support the vehicle roof 16 and at the other end to struts 26 which extend downwardly from the roof. The trays 20 are bent to form a ridge 27 extending transversely across the tray, parallel to the side of the vehicle for additional tray strength and to support packages and luggage up off from the tray for greater ease in removing such articles from the trays. The outer edge 28 of the trays 20 is bent upwardly to insure still greater tray strength and to provide a surface for receiving the light rail 30.

The light rail 30 comprises an elongated, channeled or C-shaped housing 32 which is secured to the edge 28 of the trays 20. The housing 32 may be made as one continuous member extending the full length of the vehicle or of several individual lengths adjacently arranged. As shown in Figure 4 the light rail housing 32 has top and bottom walls 34 and 36 and a side wall 38. The housing 32 is open at the side engaging the carrying tray 20. Shoulders 40 and 42 are formed at the ends of walls 34 and 36 adjacent the upturned edge 28 of the tray 20 to receive fastening means 44 for securing the housing to the tray. The shoulder 40 is also curled over as a 46 to engage the edge 28 of the tray and to assist in holding the housing 32 thereagainst.

Openings 48 are formed within the top wall 34 of the housing 32 and also within the bottom wall 36 thereof. The openings 48 are arranged at any preselected position along the length of the housing 32 and generally the openings in the top wall 34 are aligned over those within the bottom wall 36. The openings need not however necessarily be aligned. Ligting fixtures 50 are disposed within the housing 32 and are secured to the tray edge 28 adjacent the openings 48. All wiring connected to the light fixtures 50 is enclosed within the housing 32.

The portions of the side wall 38 and of the shoulders 40 and 42 which extend beyond the top and bottom walls 34 and 36 are undercut to provide grooves 52 and 54 extending the entire length of the housing. Within these grooves 52 and 54 and over the openings 48 are received lens retaining gaskets 56. The gasket 56 is adapted to receive a lens 58 and to hold the lens over the opening 48. The gaskets 56 are also adapted to engage the edges of the walls forming the openings 48 to hold the lenses 58 firmly in place thereover. Such a resilient mounting of the light diffusing lenses 58 provides protection against their breakage when parcels or luggage inadvertently come in contact therewith.

Secured to the outer surface of the side wall 38 of the light rail housing 32 is a guard or bumper rail 60. The bumper rail 60 is adapted to protect the housing 32 against accidental contact with members being raised or lowered from the carriage trays 20. The bumper 60 is provided with air pockets 62 and ribs 64 making the member more yieldable. Serrated grooves 66 and 68 are provided within the side wall 38 of the housing to receive mating serrated portions 70 and 72 formed on the bumper element 60. The groove 68 is formed parallel to the side wall 38 to enable wrapping the bumper guard around the lower edge of the wall 38.

Padding is provided for the underside of the carriage trays 20. A yieldable cushioning material 74 is fastened to the underside of the trays 20 and a covering 76 is stretched thereover to hold the material in place, and to provide a more pleasing and high quality finish thereto. The covering 76 is fastened between the light rail 30 and the upturned edge 28 of the package trays 20 and also between the trays and the side of the vehicle.

The light rail 30 when secured to the package carrying trays 20 provides for illumination of both the storage space above the passenger seats and of the aisle or passageway between the seats. Generally the light fixtures 50 will only be turned on when there is any appreciable activity of passengers moving along the aisle or making use of the carriage rack. However a few openings 48 may be provided within the top wall 34 of the light rail housing 38 which do not have other openings disposed below in the bottom wall 36. Fixtures disposed adjacent these openings would provide sufficient tray illumination for the infrequent intervals at which a passenger would make use of the tray while the vehicle was in motion.

I claim:

1. In combination with a package carrying rack having a plurality of lighting fixtures secured to the extended edge thereof, a housing for vehicle illuminating means which includes an elongated channel member extending the length of said package rack, means securing the open side of said channel member to the extended edge of said rack and over said lighting fixtures, openings formed through opposite side walls of said channel member adjacent said lighting fixtures and having translucent members resiliently supported therein, and resilient guard means secured to the other wall of said channel member and extending around one corner thereof for receiving and dissipating impact forces otherwise transmitted to said translucent members and required to be totally absorbed by the resilient supports thereof.

2. In the combination provided for by claim 1 said channel member having inturned flanges at the open side thereof for abutting said extended rack edge, one of said flanges being formed outwardly and bent over to engage said rack edge and assist in the support of said channel member thereon, and serrated grooves formed within said channel member near the upper corner and within the lower face thereof for receiving and securing said guard means about the lower corner thereof in an impact receiving disposition.

References Cited in the file of this patent
UNITED STATES PATENTS

| | | |
|---|---|---|
| 1,331,756 | Giese | Feb. 24, 1920 |
| 1,741,965 | Yates | Dec. 31, 1929 |
| 2,025,952 | Levet | Dec. 31, 1935 |
| 2,250,619 | Austin | July 29, 1941 |
| 2,263,063 | Allen | Nov. 18, 1941 |
| 2,310,593 | Orlicki | Feb. 9, 1943 |
| 2,332,039 | Zampoi | Oct. 19, 1943 |
| 2,525,315 | Schepmoes | Oct. 10, 1950 |